United States Patent [19]
Holmdahl

[11] Patent Number: 5,675,813
[45] Date of Patent: Oct. 7, 1997

[54] SYSTEM AND METHOD FOR POWER CONTROL IN A UNIVERSAL SERIAL BUS

[75] Inventor: Todd E. Holmdahl, Bothell, Wash.

[73] Assignee: Microsoft Corporation, Redmond, Wash.

[21] Appl. No.: 548,562

[22] Filed: Oct. 26, 1995

[51] Int. Cl.$^6$ .............................. G06F 9/06; G06F 15/20; G06F 15/56

[52] U.S. Cl. ............................................. 395/750; 395/492

[58] Field of Search ......................... 395/750; 364/480, 364/490, 492

[56] References Cited

U.S. PATENT DOCUMENTS

| | | | |
|---|---|---|---|
| 4,747,041 | 5/1988 | Engel et al. | 364/492 |
| 5,359,540 | 10/1994 | Ortiz | 364/492 |
| 5,410,713 | 4/1995 | White et al. | 395/750 |
| 5,506,790 | 4/1996 | Nguyen | 364/492 |

Primary Examiner—Jack B. Harvey
Assistant Examiner—Ario Etienne
Attorney, Agent, or Firm—Seed and Berry LLP

[57] ABSTRACT

A bus powered hub having a switch to control power distribution in a universal serial bus. A single switch is used to control power distribution to a number of peripherals connected to the bus powered hub. When the bus powered hub is initialized, the switch is activated thus providing power to the peripheral devices coupled to the bus powered hub. The system subsequently queries the peripheral devices to determine if an illegal configuration exists. If an illegal configuration exists, the system generates an error message to the user indicating the nature of the illegal configuration. If no illegal configuration exists, the system initializes the various peripheral devices.

31 Claims, 7 Drawing Sheets

SYSTEM AND METHOD FOR POWER CONTROL IN A UNIVERSAL SERIAL BUS

TECHNICAL FIELD

The present invention relates generally to a computer bus, and, more specifically, to a system and method for controlling distribution of power in the computer bus.

BACKGROUND OF THE INVENTION

Computers are used in a variety of applications. Various peripheral devices have enabled computers to perform many functions that were previously performed by stand-alone devices. For example, facsimile machines and data modems, which were once available only as stand-alone devices, can now be incorporated into a conventional microcomputer as an interface board coupled to a peripheral device such as a telephone or telephone outlet. The various interfaces in a typical microcomputer are coupled together by a bus. The bus may carry both data and power to the various interfaces.

The drawback of using many different peripheral devices is that each typically has a unique connector, which does not permit widespread interchangeability of peripheral devices. For example, a computer printer has one type of connector, a computer keyboard has a different type of connector, and a pointing device such as a mouse has yet a third type of connector. The different connector types prevent the accidental connection of a peripheral device to the wrong interface. However, they require the user to carefully match the plug on each peripheral device with the corresponding connector on the computer. Another drawback of using peripheral devices with different connectors is that the computer itself must accommodate a large number of connectors. The back panel of a typical microcomputer is often covered with many connectors and the result is a maze of tangled cables coupled to those connectors. To relieve the cable congestion and reduce the number of connectors on the back panel of the computer, peripheral devices can be connected to the computer through a data hub. A data hub is a central data connection point which functions as a type of "extension outlet" and typically takes the form of one peripheral device that serves as the central connection point for other devices. The device serving as the data hub connects directly to the computer while other devices are connected to the data hub instead of directly to the computer. The data hub relays data from the computer to all enabled devices coupled to the data hub, and relays data from the enabled devices to the computer. This data relay is performed without any data storage or significant delay. A universal serial data bus provides such a data hub. The peripheral devices often receive their power from a power bus via the data hub. However, there is currently no convenient way to control power distribution via a bus powered data hub to assure proper connectivity and reliability in performance.

Therefore, it can be appreciated that there is a significant need for a system and method to control power distribution in a bus powered data hub. The present invention provides this and other advantages, as will be illustrated by the following description and accompanying drawings.

SUMMARY OF THE INVENTION

The present invention is embodied in a system and method for the control of power distribution in a universal serial bus to a host computer. The host computer includes a master hub which is continuously powered by the computer and provides a power source. The system includes a power supply connector coupled to the power source and receiving power therefrom. A hub controller is coupled to the computer and receives commands from the computer. The hub controller is continuously powered from the power source via the power supply connector. A power switch is coupled to the power source and responds to a power command from the hub controller to activate the power switch. The power switch provides power to a peripheral device coupled to the hub controller when the power switch is activated.

The power switch may be a transistor, such as a field-effect transistor or a bipolar transistor. The power switch may also be a mechanical relay.

The power switch is activated when the master hub initially addresses the hub controller. The power switch may also include a current limiting circuit that limits current provided to the peripheral devices by the power switch. In addition, the power switch may include a voltage-limiting circuit coupled to the power switch to limit the voltage at the power switch to a predetermined voltage level.

The peripheral devices coupled to the hub controller each provide identification data indicating a power requirement for the particular peripheral device. The system includes an error message generator to generate an error message to indicate an illegal configuration if the device identification data indicates that the power requirement exceeds a predetermined level. The error message generator generates the error message on an output device coupled to the computer. The output device may be a visual display or a printer coupled to the computer.

In a preferred embodiment, the power switch provides power for four peripheral devices. Each of the peripheral devices require no greater than 100 milliamps. The power switch in the preferred embodiment can switch a total of at least 400 milliamps of current to the additional peripheral devices.

DETAILED DESCRIPTION OF THE INVENTION

Figure 1:
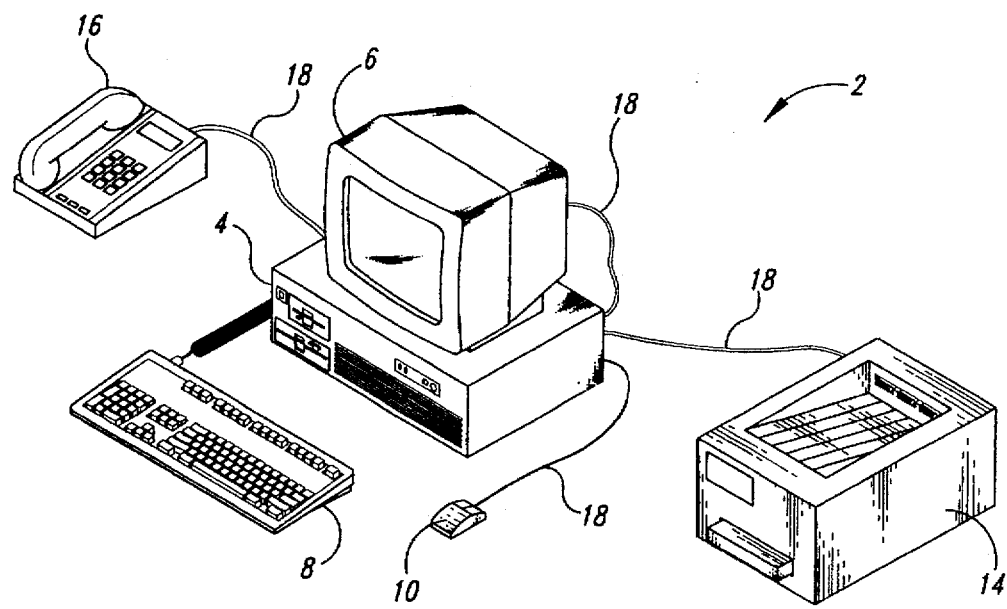
FIG. 1 illustrates the connection of various peripheral devices to a conventional computer.

As discussed above, there has been a significant increase in the number of peripheral devices coupled to a typical computer. A typical computer system 2 is illustrated in FIG. 1 and includes a host computer 4, which contains a power supply, central processing unit, memory, disk drive, and the like. The operation of these conventional components are well understood and form no part of the present invention. Therefore, for the sake of clarity, these elements are not illustrated. The computer system 2 also has numerous peripheral devices such as a video display 6, a keyboard 8, and a pointing device 10, such as a mouse ball point or joystick, coupled to the computer 4. In addition, the typical computer system 2 includes a printer 14 and a telephone 16, which are also coupled to the computer 4.

Each of the peripheral devices illustrated in FIG. 1 has a wire cable 18 connecting the peripheral device to the computer 4. Each wire cable 18 terminates in a connector (not shown) that is unique to the peripheral device. A mating connector (not shown) on the computer 4 can be used only for that particular peripheral device. For example, the printer 14 has one connector type, while the keyboard 8 has a second connector type. The telephone 16 has yet a third connector type. Even the same peripheral device may have different connector types depending on the interface to which it is coupled. For example, the printer 14 has one connector type if the printer has a parallel printer interface, and a second connector type if the printer has a serial interface. The computer 4 has one or both of the connectors corresponding to the serial and parallel printer interfaces.

The numerous different types of connectors cause two different problems. First, the user must determine precisely which connector on the computer 4 corresponds to the connector on the wire cable 18 of the peripheral device to be connected to the computer 4. Second, the requirement of large numbers of different connectors on the computer 4 occupies a large amount of space on the back panel of the computer, thus limiting potential future expansion capabilities.

To solve these problems, a group of computer hardware and software manufacturers have developed the universal serial bus (USB). The USB is designed to solve both of the problems outlined above. First, the USB uses only one connector type thus eliminating the problem of unique connectors for each type of peripheral device. Any peripheral device with a USB connector can be plugged into any corresponding USB connector on the computer 4. Thus, the USB provides universal connectivity. This universal connectivity is not without problems, however, as will be discussed below. Second, the use of the USB permits the introduction of data hubs in which one peripheral device which is connected directly to the computer 4 acts as a central data connection for other peripheral devices to connect them indirectly to the computer 4.

Figure 2:
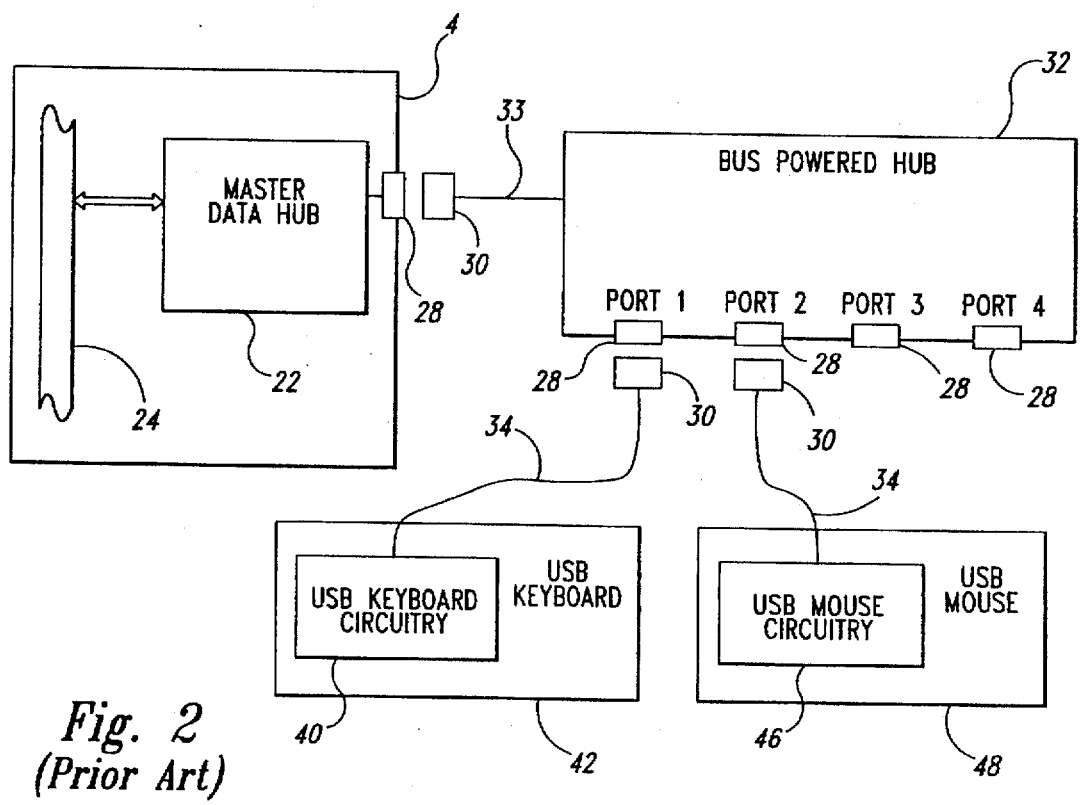
FIG. 2 is a functional block diagram illustrating the use of a conventional universal serial bus.

The concept of USB data hubs is illustrated in the functional block diagram of FIG. 2. A USB interface within the computer 4 includes a master data hub 22 which is coupled by an internal bus 24 to a central processing unit, memory, power supply, and other conventional components of the computer 4 that are not specifically illustrated herein.

The master data hub 22 includes at least one USB connector 28, which mates with a corresponding USB plug 30. It should be noted that the computer 4 may include one or more master data hubs 22, each coupled to a bus powered hub 22, a self-powered data hub (not shown), or any USB peripheral device with the USB plug 30. A self-powered data hub or USB peripheral device is defined herein as a device that receives power directly from a power supply such as the internal bus 24 (see FIG. 2) or a self contained power supply. A bus powered hub or a bus powered USB peripheral device is defined as a device which receives its power via the USB. The present invention is directed to bus powered hubs and bus powered USB peripheral devices.

In the example illustrated in FIG. 2, the USB utilizes a bus powered hub 32 which is coupled to the master data hub 22 by a wire cable 33 which terminates with an associated plug 30. The wire cable 33 is a four conductor cable in which two of the four conductors are used for power distribution, and the remaining two conductors are used for data communication. The two wires used for power are designated as $V_{cc}$ (+5 VDC) and ground (GND). The two wires carrying data signals are a twisted pair data cable used for bidirectional data communication between the master data hub 22 and the bus powered hub 32. It should be noted that a low speed version of the wire cable 33 does not use the twisted pair data cable. The examples discussed herein use the high speed version of the wire cable 33 with the twisted pair data cable. However, the principles of the present invention are applicable to both the low speed and high speed versions of the wire cable 33. Details of the USB, including descriptions of the operation of the master data hub 22 and bus powered hub 32, and the physical specification for the USB connector 28, the USB plug 30 and the wire cable 33 are contained within a document entitled "Serial Bus Specification," Compaq Computer Corporation, Digital Equipment Corporation, Intel Corporation, Microsoft Corporation, NEC Corporation, and Northern Telecom, 1994, and will not be discussed in detail herein.

The bus powered hub 32 contains a plurality of USB connectors 28 to permit multiple peripheral devices to be coupled to the master data hub 22 through the bus powered hub 32. These peripheral devices are each connected by a wire cable 34 to the bus powered hub 32. By definition, the bus powered hub 32 does not have its own power supply, but receives power from the internal bus 24 (i.e., it is bus powered) of the computer 4 via the master data hub 22 over the wire cable 33.

For example, a USB keyboard 42 is illustrated in FIG. 2 connected to the bus powered hub 32 via its wire cable 34. The USB keyboard 42 has a USB keyboard circuitry 40 which provides an interface between the USB keyboard and the bus powered hub 32. The keystrokes entered by the user on the USB keyboard 42 are encoded in a conventional manner and are serially transmitted by the USB keyboard circuitry 40 through the bus powered hub 32 to the master data hub 22 within the computer 4.

For the sake of clarity, the bus powered hub 32 is shown in FIG. 2 as a separate element. However, in an actual implementation of the USB, the bus powered hub 32 may be physically located within one of the peripheral devices. In one such implementation, the bus powered hub 32 is mounted in a housing (not shown) of the USB keyboard 42, and the USB connectors 28 of the bus powered hub are mounted on the keyboard housing to permit the external connection of USB plugs 30 from additional peripheral devices. In such an embodiment, the connection of the USB keyboard circuit 40 to the bus powered hub 32 could be internal to the keyboard housing instead of through an external wire cable 34. Those of ordinary skill in the art can readily appreciate that the USB keyboard circuitry 40 may be incorporated directly into a printed circuit board (not shown) which also contain the bus powered hub 32 if the bus powered hub is physically located in the keyboard housing. This would eliminate the need for the wire cable 34, the USB plug 30, and the USB connector 28 shown in FIG. 2 associated with the USB keyboard circuitry 40.

In addition to the USB keyboard 42, other peripheral devices, such as a USB mouse 48, may be connected to the master data hub 22 via the bus powered hub 32. USB mouse circuitry 46 contained within the USB mouse 48 is connected to the bus powered hub 32 by its wire cable 34 using the associated USB plug 30 and USB connector 28. Movement of the USB mouse 48 is detected in a conventional manner and data corresponding to the detected movement are serially transmitted from the USB mouse circuitry 46 to the master data hub 22 via the bus powered hub The advantage of the bus powered hub 32 is that it contains a plurality of USB connectors 28 thus permitting a number of peripheral devices to be connected to the bus powered hub 32 with only the single wire cable 33 being required for connection to the master data hub 22. However, the universal connectivity provided by the USB permits the USB mouse 48 to be connected directly to the master data hub 22 by plugging USB plug 30 of the wire cable 34 of the USB mouse directly into the USB connector 28 on the computer 4 if desired.

As discussed above, the power for the bus powered hub 32, the USB keyboard circuitry 40, and the USB mouse circuitry 46 is provided by the master data hub 22 via the wire cable 33. Thus, the USB keyboard circuitry 40 and the USB mouse circuitry 46 are designated as "hub powered devices" since they receive their power from the master data hub 22 through the bus powered hub 32. The advantage of the USB is that there is only one connector type, which allows virtually universal connectivity of peripheral devices. For example, the USB mouse 48 is to be plugged into the computer 4 via the bus powered hub 32, as illustrated in FIG. 2. However, the USB mouse 48 could also be plugged directly into the master data hub 22 or to any additional bus powered hub (not shown). Thus, any USB peripheral device can be plugged in virtually anywhere on the computer system, either to the bus powered hub 32, the master data hub 22, or the additional bus powered hub (not shown).

While the universal connectivity of the USB simplifies installation for the user, there are potential drawbacks to the universal connectivity, especially when the peripheral devices are hub powered devices. The master data hub 22 is capable of providing only limited current to supply hub powered devices. The USB specification requires that the master data hub 22 provide 500 milliamps (mA) of current. The USB specification defines 100 mA as one unit of current load. Thus, the master data hub 22 is capable of providing five unit current loads to the bus powered hub 32. The bus powered hub 32 consumes approximately one unit of current load itself thus limiting the number of additional peripherals to a total of four units of current loads.

USB peripheral devices are designated as low-power or high-power devices. High-power USB devices consume too much power to be operated as hub powered devices on the bus powered hub 32. These high power peripheral devices have an external power supply and are not described in detail herein. All high-power peripheral devices designed to the USB specification must power up in a low-power state consuming no more than 100 mA. The high power peripheral devices remain in the low power state, initially consuming no more than 100 mA, until instructed by the master hub 22 to enter a high-power state. A low-power peripheral device always consumes no more than one unit of current load. The master data hub 22 can provide adequate current to power four low-power peripherals (or four high power devices in the low power state) as well as the bus powered hub 32 itself. However, if one of the peripheral devices is a high-power device that consumes more than one unit of current load when in the high-power state, or if an additional bus powered hub is connected to the master data hub 22, the master data hub may not be able to provide adequate power. This would result in the $V_{cc}$ wire of the wire cable 33 being pulled below the nominal operating voltage required for proper operation of the peripheral devices. This is an unacceptable condition in the USB.

The present invention is designed to prevent the accidental overload of the 500 mA power supply capacity of the master data hub 22. The present invention is illustrated in the functional block diagram of FIG. 3A where the master data hub 22 is coupled by the wire cable 33 to the bus powered hub 32. For the sake of simplicity, FIG. 3A does not show the USB connectors 28 or the USB plugs 30. A data cable 52, which is part of the wire cable 33, is used to transmit data bidirectionally between the master data hub 22 and the bus powered hub 32. As previously discussed the data cable 52 is the twisted pair data cable in the high speed version of the wire cable 33. A $V_{cc}$ line 54 and a GND line 56 which also form a part of the wire cable 33 provide power from the master data hub 22 to the bus powered hub 32. Resistors $R_T$ are coupled between the $V_{cc}$ line 54, the GND line 56, and the twisted pair data cable 52 within the bus powered hub 32. The resistors $R_T$ help assure proper input voltage levels. In addition, the resistors $R_T$ permit the master data hub 22 to determine whether the bus powered hub 32 is present and provide an indication whether the bus powered hub is a low speed or high speed device. As previously discussed, the high speed version of the wire cable 33 uses the twisted pair data cable, while the low speed version does not. The system identifies the bus powered hub 32 as low speed or high speed by virtue of which wire in the data cable 52 is tied to the Vcc line 54 and which wire is tied to the GND line 56. The Serial Bus Specification calls for the resistors $R_T$ to have a value of approximately 1,500 ohms. It should be noted that the resistors $R_T$ present a high impedance relative to the characteristic impedance of the twisted pair data cable 52. Thus, the resistors $R_T$ in the bus powered hub 32 are not intended for impedance matching purposes. However, the resistors $R_T$ place voltage on the twisted pair data cable 52 when the bus powered hub 32 is connected to the master data hub 22. This voltage can be detected by the master data hub 22 to indicate that a bus powered hub 32 has been connected. If nothing is connected to the master data hub 22, there is no voltage present on the twisted pair data cable 52 coupled to the master data hub 22. However, when the bus powered hub 32 is connected to the master data hub 22, the resistors $R_T$ apply a voltage to the twisted pair data cable 52 thus indicating the presence of the bus powered hub.

Figure 3A:
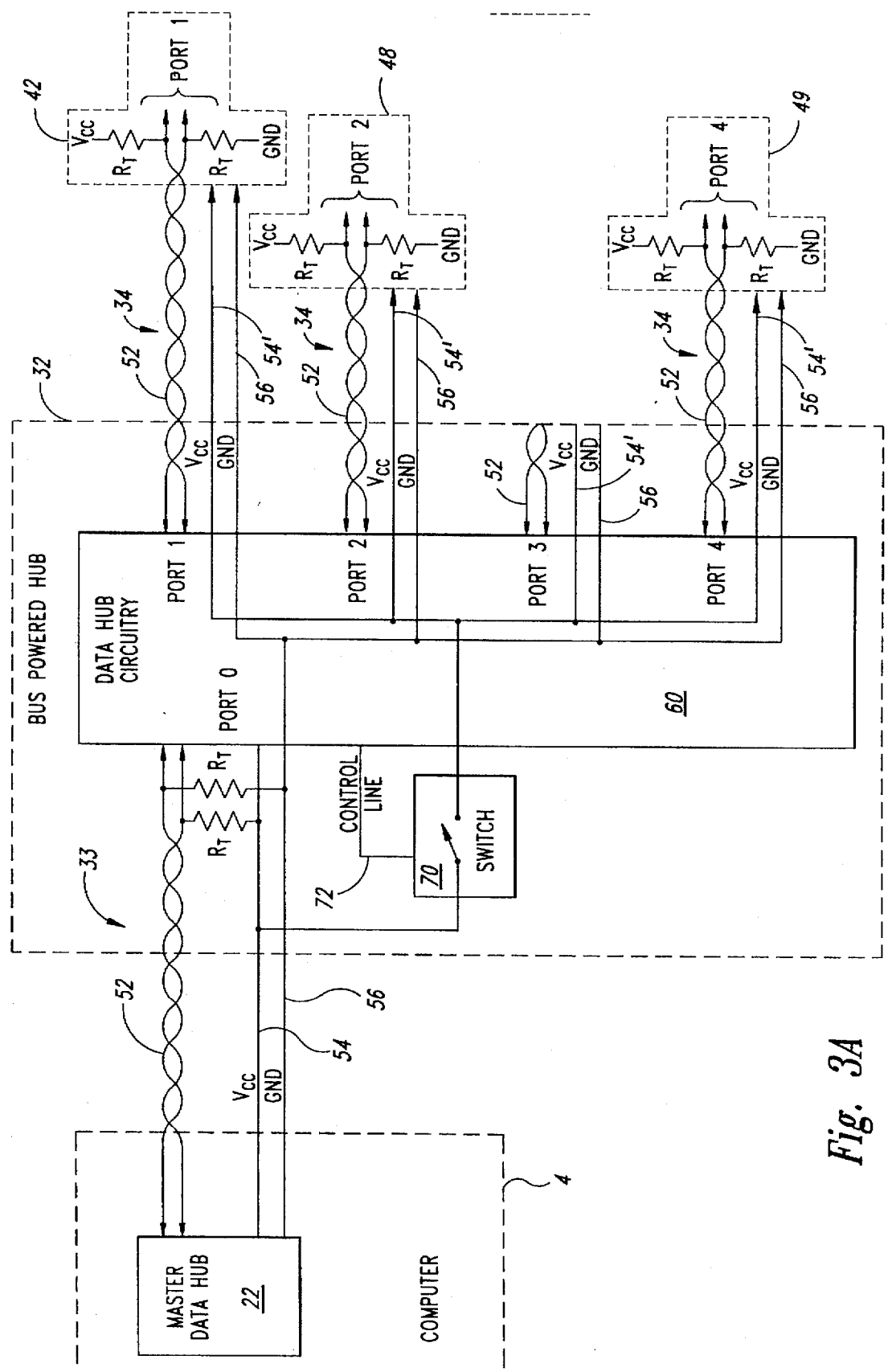
FIG. 3A is a functional block diagram of a system according to the present invention illustrating the control of power distribution in the universal serial bus.

Similar resistors $R_T$ are present at the ends of the twisted pair data cable 52 coupling the USB peripheral devices to data hub circuitry 60. In the example illustrated in FIG. 3A, the USB keyboard 42 is coupled to port 1 of the bus powered hub, while the USB mouse 48 is coupled to port 2 of the bus powered hub. FIG. 3A also illustrates the connection of an additional USB peripheral device 49 to port 4 of the bus powered hub 32. The additional peripheral device 49 can be any low-powered peripheral device meeting the specifications of the USB. The specific operation of the additional USB peripheral device 49 will not be discussed herein. The data hub circuitry 60 detects the presence or absence of a peripheral device using the resistors $R_T$ within the USB peripheral device. If a peripheral device is present, the resistors $R_T$ produce a voltage detectable by the data hub circuitry 60 to indicate the presence of the peripheral device. In contrast, if no peripheral device is present, there are no termination resistors $R_T$ and thus no voltage present on the twisted pair data cable 52. In the example illustrated in FIG. 3A, the resistors $R_T$ in the USB keyboard 42 produce the voltage on the twisted pair data cable 52 coupling the USB keyboard to port 1 of the bus powered hub 32. Thus, the bus powered hub 32 knows that a peripheral device is coupled to port 1. Similarly, the resistors $R_T$ in the USB mouse 48 produce a voltage on the twisted pair data cable 52 coupled to port 2 in the bus powered hub 32. Thus, the bus powered hub 32 is aware that a peripheral device is coupled to port 2. However, as illustrated in FIG. 3A, no peripheral device is coupled to port 3 of the bus powered hub 32. There is no voltage produced by a peripheral device on the twisted pair data cable 52. Thus, the bus powered hub 32 is aware that no peripheral device is connected to port 3 of the bus powered hub. If a peripheral device is subsequently coupled to port 3, the resistors $R_T$ within the peripheral device would generate the necessary voltage to indicate to the bus powered hub that a peripheral device is now coupled to port 3. As discussed above, the resistors $R_T$ also provide an indication of whether the USB peripheral device is a low speed or high speed device. The particular connection of the wires in the twisted pair data cable 52 to the Vcc line 54 and the GND line 56 through the resistors $R_T$ is described in the Serial Bus Specification and need not be discussed herein.

The data hub circuitry 60 within the bus powered hub 32 provides address decoding and data processing functions in accordance with the USB specification, and need not be discussed in detail herein. The $V_{cc}$ line 54 and GND line 56 of the wire cable 33 are coupled directly to the data hub circuitry 60 and provide power on a continuous basis. The bus powered hub 32 provides up to four individual peripheral ports port 1–port 4 to which additional peripheral devices may be connected. While the bus powered hub 32 is continuously powered by the $V_{cc}$ line 54, the additional peripheral devices, coupled to the peripheral ports port 1–port 4, are initially unpowered. To control power delivery to the peripheral ports port 1–port 4, the bus powered hub 32 includes a switch 70 between the $V_{cc}$ line 54 of wire cable 33 from the master data hub 22 and a switched $V_{cc}$ line 54' coupled to the switched $V_{cc}$ lines 54' of the wire cables 34 for each of the peripheral ports port 1–port 4, respectively. The switch 70 is selectively activated by a control line 72 from the data hub circuitry 60. It should be noted that the master data hub 22 does not contain a switch 70. Thus, the master data hub 22 provides power to the bus powered hub 32 whenever power is applied to the computer 4.

Figure 3B:
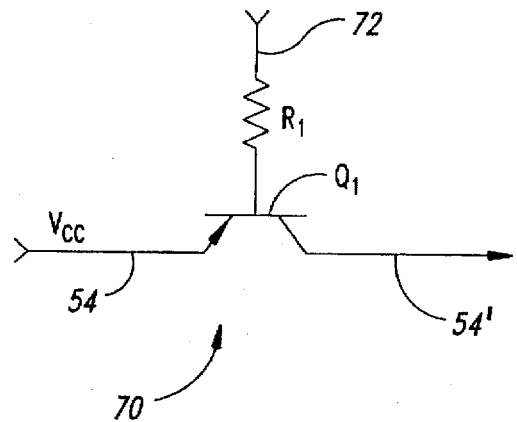
FIG. 3B illustrates one embodiment of the control circuit of FIG. 3A.
Figure 3C:
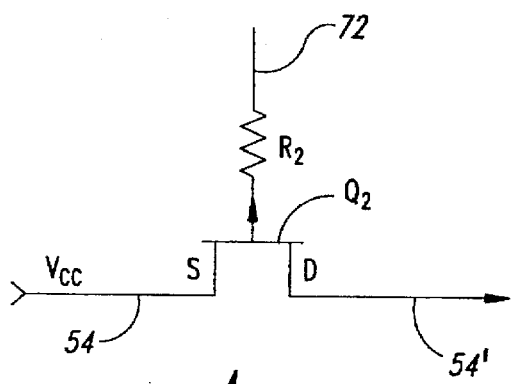
FIG. 3C illustrates an alternative embodiment of the control circuit of FIG. 3A.
Figure 3D:
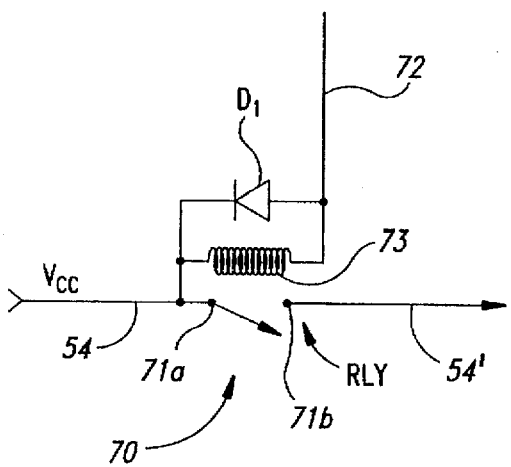
FIG. 3D illustrates another alternative embodiment of the control circuit of FIG. 3A.

The switch 70 may be a mechanical or electronic relay, transistor, or the like. Some alternative embodiments of the switch 70 are illustrated in FIGS. 3B–3D. In FIG. 3B, the switch 70 is a bipolar transistor $Q_1$ whose base is coupled to the control line 72 by a current limiting resistor $R_1$. In FIG. 3C, the switch 70 is a field-effect transistor (FET) $Q_2$. The gate of the FET $Q_2$ is coupled to the control line 72 by a current limiting resistor $R_2$. In yet another alternative embodiment, the switch 70 is a mechanical relay RLY. Relay contacts 71a and 71b close when a coil 73 is energized. The coil 73 is energized by the control line 72. A diode $D_1$ across the coil 73 of the relay RLY protects the data hub circuitry 60 (see FIG. 3A) in the event that an excessive voltage is generated by the relay RLY. As those skilled in the art can appreciate, other forms of electrical circuits, such as a CMOS switch, can be used as the switch 70. The present invention is not limited by the specific form of the switch 70.

When power is first applied to the computer 4 (see FIG. 3A), the master data hub 22 (see FIG. 3A) receives power from the internal bus 24 (see FIG. 2) and, in turn, supplies power to the data hub circuitry 60. However, the control line 72 is initialized to an inactive state, which forces the switch 70 to an inactive state. Thus, the peripheral ports port 1–port 4 are initially unpowered when the computer 4 is first turned on. During an initialization procedure, the control line 72 selectively activates the switch 70 and the peripherals coupled to the peripheral ports port 1–port 4 are powered up and initialized. This process of powering up and initialization will be discussed in greater detail below.

The switch 70 is activated when the master data hub 22 initially addresses the bus powered hub 32. Once the switch 70 has been activated, the peripheral ports port 1–port 4 are powered up. As previously discussed, the USB specification requires that all high power peripheral devices power up in the low-power state, in which the power consumption requirements are no more than one unit of current load (100 mA). Low power devices are designed to consume no more than one unit of current load. Thus, no peripheral device connected to the bus powered hub 32 will initially use more than one unit of current load. The master data hub 22 and the bus powered hub 32 will subsequently go through an initialization process for each of the peripheral ports port 1–port 4 in which the peripheral device coupled to the port is identified and assigned an address. If one of the peripheral devices coupled to peripheral ports port 1–port 4 results in an illegal configuration, the data hub circuitry 60 detects this condition and reports the illegal configuration to the master data hub 22. Any configuration of peripheral devices that results in a power demand that exceeds the USB specification of 500 mA from the master data hub 22 is designated herein as an illegal configuration. As a result, an error message is generated for the user on the video display or printer of the computer, indicating that an illegal configuration exists, and further indicating the nature of the illegal configuration. As previously discussed, the computer 4 may include one or more master data hubs 22 and one or more bus powered hubs 32. Each of the bus powered hubs 32 undergoes the initialization process described above. Thus, any peripheral devices coupled to a bus powered hub 32 remain unpowered until the bus powered hub is initialized by the master data hub 22 to which it is connected. Because each of the bus powered hubs 32 are individually initialized, the system can identify the nature and location of the illegal configuration. Thus, the user is provided with a simple message that an illegal connection exists in a particular bus powered hub 32.

Figure 4A:
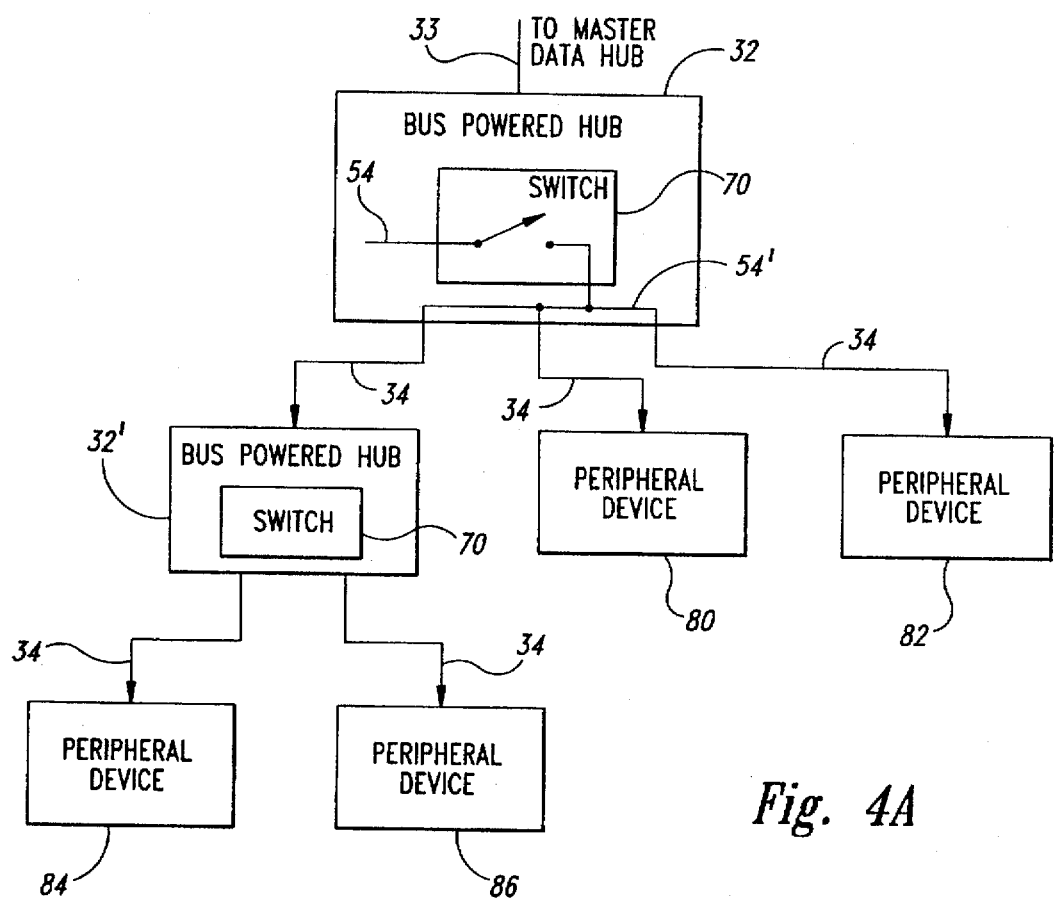
FIG. 4A is a functional block diagram illustrating an example of an illegal configuration detected by the system of FIG. 3A.

One example of an illegal configuration is illustrated in the functional block diagram of FIG. 4A. As seen in FIG. 4A, the bus powered hub 32 is coupled to the master data hub 22 (see FIG. 3A) in the manner previously described. A number of peripheral devices 80 and 82 are coupled to the bus powered hub 32 in the manner previously described. For the sake of simplicity, FIG. 4A does not illustrate common elements such as the USB connector 28 (see FIG. 2) or the USB plug 30. It is assumed that the peripheral devices 80 and 82 are designed to meet the standards imposed by the USB specification. That is, each of the peripheral devices 80 and 82 must be a low-power device and consumes no more than one unit of current load. For example, the peripheral devices 80 and 82 could be the USB keyboard 42 and the USB mouse 48, respectively, of FIG. 2.

Because all USB devices use the identical USB plug 30, it is possible to connect devices in a manner that results in a legal configuration. For example, FIG. 3A illustrates the connection of the bus powered hub 32 to the computer 4. However, the bus powered hub 32 could be plugged into another bus powered hub, resulting in an illegal configuration. Such an illegal configuration is illustrated in FIG. 4A. An additional bus powered hub 32' is also coupled to the bus powered hub 32, constituting the illegal configuration. The additional bus powered hub 32' consumes approximately one unit of current load itself. Thus, the combination of the peripheral devices 80 and 82 along with the additional bus powered hub 32' do not draw more than the four units of current loads to be supplied by the bus powered hub 32. However, the additional bus powered hub 32' can have a number of additional peripheral devices 84 and 86 connected to it. The current load requirement of all the peripheral devices 80–86 in combination with the additional bus powered hub 32' exceed the four unit current load supply capacity of the bus powered hub 32 as well as the five units of current capacity of the matter data hub 22 (see FIG. 3A). The present invention detects such illegal configurations and generates an appropriate error message for the user. It should be noted that the system of the present invention does not monitor the actual current flow to determine the existence of an illegal configuration. Rather, the system relies on the initialization process to determine the current requirements of the various system components. In the example illustrated in FIG. 4A, the bus powered hub 32 requires one unit of current load. When the switch 70 within the bus powered hub is activated, the data hub circuitry 60 (see FIG. 3A) detects the presence of three devices coupled to the bus powered hub 32. When the peripheral devices 80 and 82 are initialized, each will identify itself and provide an indication of the current requirements for the respective peripheral devices. Similarly, when the additional bus powered hub 32' is initialized, it identifies itself as a bus powered hub. The system uses the identification data to determine that the additional bus powered hub 32' constitutes the illegal configuration. In this event, the switch 70' in the additional bus powered hub 32' is not activated. Thus, two additional peripheral devices 84 and 86 will not be powered, nor will they be identified in the initialization process. Rather, the user is notified that the connection of the additional bus powered hub 32' results in an illegal configuration. The user may also be advised that the additional bus powered hub 32' must connected directly to a self powered hub, such as an additional master data hub 22 (not shown). Furthermore, as will be described below, the present invention prevents any illegal configuration from affecting overall operation of the computer 4.

Each bus powered hub, including the bus powered hub 32 and the additional bus powered hub 32' contains the switch 70 to regulate power distribution. Without the switches 70 to regulate power distribution, power would be applied directly to the bus powered hub 32 (one unit of current load), the additional bus powered hub 32' (one unit of current load), and peripheral devices 80–86 (four peripheral devices at one unit of current load each) when the computer 4 is turned on. This load would be at least six units of current load (i.e., 600 mA), which exceeds the five units of current load supply capacity of the master data hub 22 (see FIG. 3A). As a result of the overload condition, the voltage level on the Vcc line 54 (see FIG. 3) would drop. The voltage drop could cause the computer 4 to malfunction if allowed to happen. In such a situation, the computer 4 might not operate properly and the user would have no clue as to the cause of the malfunction. However, the switches 70 prevent such an illegal configuration from affecting overall operation of the computer 4 and advises the user of the illegal configuration so that it can be corrected.

When the switch 70 in the bus powered hub 32 is first activated, approximately three units of current load will be consumed (one unit of current load for each peripheral device 80 and 82, respectively, and one unit of current load for the additional bus powered hub 32'). However, the power capacity of the bus powered hub 32 would be exceeded if the switch 70' within the additional bus powered hub 32' were activated because the current requirements of the peripheral devices 84 and 86 combined with the power requirements of the additional bus powered hub and the peripheral devices 80 and 82 exceed the supply capacity of the bus powered hub 32. Thus, the configuration shown in FIG. 4A is an illegal configuration. To prevent such illegal configurations from doing any harm, the bus powered hub 32 detects the illegal configuration and will not enable the switch 70 in the additional bus powered hub 32'. Because the switch 70 in the additional bus powered hub 32' is not activated, the peripheral devices 84 and 86 remain unpowered and the load on the bus powered hub 32 and the master data hub 22 remain within the USB specification. Thus, the switches 70 regulate power distribution prevent the inadvertent overload caused by the illegal configuration. In addition, as discussed above, the USB generates an error message to the user indicating the nature of the illegal configuration. In the example illustrated in FIG. 4A, the error message indicates that the connection of the additional bus powered hub 32' is an illegal configuration, and that the additional bus powered hub 32' must be disconnected and should be connected to an additional master data hub (not shown). This permits the user to correct the illegal configuration and to reinitialize the USB interfaces.

Figure 4B:
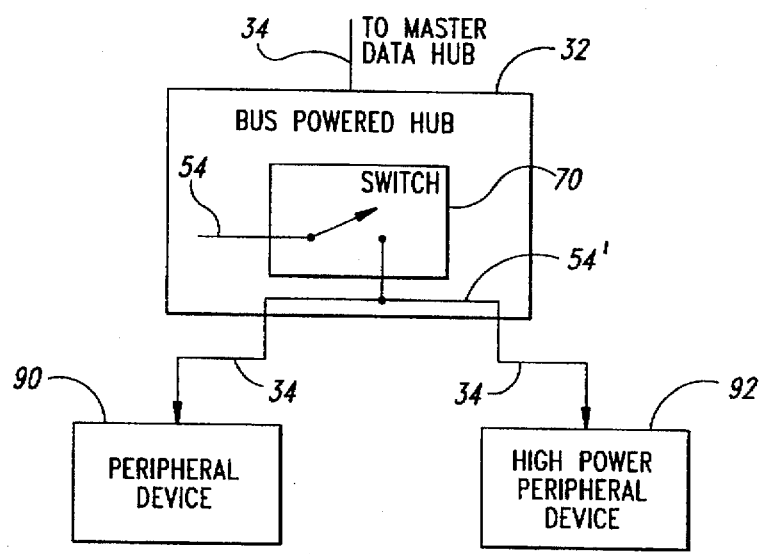
FIG. 4B is a functional block diagram illustrating another example of an illegal configuration detected by the system of FIG. 3A.

FIG. 4B illustrates another example of an illegal configuration. In the example of FIG. 4B, the bus powered hub 32 is coupled to the master data hub 22 (see FIG. 3A) in the manner previously described. Peripheral devices 90 and 92 are coupled to the bus powered hub in the manner previously described. Again, FIG. 4B does not illustrate common elements such as the USB connector 28 or the USB plug 30. In the example illustrated in FIG. 4B, the peripheral device 90 is a low-power device and consumes no more than one unit of current load. However, the peripheral device 92 is a high-powered peripheral device that consumes more than one unit current load in its high-powered state. As previously discussed, the high-power peripheral device 92 is initially powered up in a low-power state, which consumes no more than one unit of current load. The switch 70 is first activated when the master data hub 22 (see FIG. 3A) initially addresses the bus powered hub 32. When the switch 70 is activated, the peripheral device 90 and the high-power peripheral device 92, in its low-power state, require a total of two units of current load from the bus powered hub 32. This current load is within the USB specification for the bus powered hub 32. The total current required from the master data hub 22 (see FIG. 3A) is three unit current loads, which is also within the USB specification for the master data hub. If the high-power peripheral device 92 were initially in its high-power state, the current requirements may exceed the USB specifications. However, as discussed above, the high-power peripheral device 92 will remain in its low-power state until it receives instructions from the bus powered hub 32 to enter the high-power state. During the initialization procedures, which will be discussed below, the high-power peripheral device 92 will be identified as a high-powered peripheral device, and will not be permitted to enter the high-powered state. The connection of the high-power peripheral device 92 to the bus powered hub 32 constitutes an illegal configuration since the total power at demand of the peripheral device 90 and the high-power peripheral device 92 may exceed the USB specification for the bus powered hub 32 and the master data hub 22. As previously discussed, the system detects the illegal configuration during the initialization process. After the switch 70 in the bus powered hub 32 is activated, the peripheral devices 90 and 92 are initialized. the peripheral device 90 provides identification and data regarding its power requirements. Because the peripheral device 90 is a low-power device, the initialization and activation of the peripheral device 90 will not constitute an illegal configuration. Similarly, the high-power peripheral device 92 provides identification data and data related to its power requirements when it is initialized. However, unlike the low-power peripheral device 90, the presence of the high-power peripheral device 92 constitutes an illegal configuration. Therefore, the high-power peripheral device 92 will not be initialized and activated. Thus, the high-power peripheral device 92 will remain in its low-power state, thus avoiding excessive power drain on the bus powered hub 32 and the master data hub 22 (see FIG. 3A). In such a situation, the USB generates an error message to the user indicating the nature of the illegal configuration. In the example illustrated in FIG. 4B, the error message indicates that the connection of the high-power peripheral device 92 to the bus powered hub 32 is an illegal configuration and that the high-power peripheral device 92 must be disconnected and should be connected to an additional master data hub (not shown). This permits the user to correct the illegal configuration and to reinitialize the USB interfaces.

Figure 5:
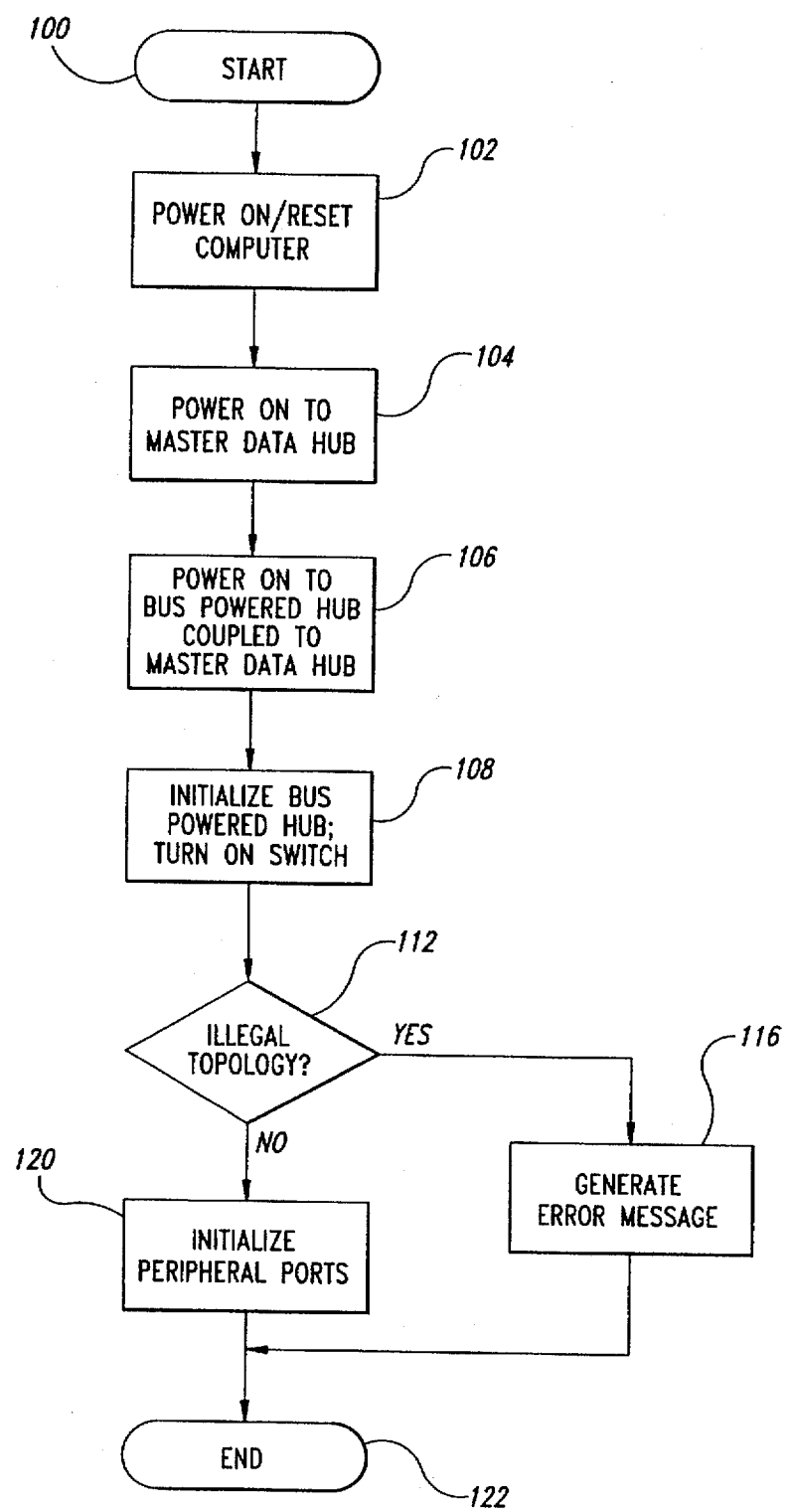
FIG. 5 is a flow chart illustrating the power up and initialization procedures used by the system of FIG. 3A.

The initialization and power-up operation is illustrated in the flow chart of FIG. 5. At the start 100, it is assumed that the computer 4 is either unpowered or about to be reset. In step 102, the power is turned on to the computer 4 or the computer is reset. In step 104, power is supplied via the internal bus 24 (see FIG. 2) to the master data hub 22 (see FIG. 3A). As previously noted, the master data hub 22 does not contain a switch, such as the switch 70 in the bus powered hub 32. Thus, in step 106, power is automatically supplied to the bus powered hub 32 which is coupled to the master data hub 22. Again, the data hub circuitry 60 (see FIG. 3A) receives power directly from the master data hub 22 and is not supplied with power from the switch 70.

In step 108, the master data hub 22 begins the initialization of the bus powered hub 32. Upon power-up/reset, the data hub circuitry 60 is designated as port 0. The master data hub 22 requests data input from port 0. In response to this request, the data hub circuitry 60 in the bus powered hub 32 provides identification data to the master data hub 22 in a manner dictated by the standards of the USB specification. The specific exchange of data that occurs in this initialization process is well known and need not be described in detail herein. The identification data provided by the bus powered hub 32 can include manufacturer and product identification, revision number, power requirements, and data configuration information. The computer 4 uses the identification data to determine if an illegal configuration exists. The computer 4 also uses the identification data to assign one or more I/O addresses other than port 0 to the bus powered hub 32. Thus, the initialized bus powered hub will have an address other than port 0, and will no longer respond to data requests from the master data hub 22 to port 0.

Returning again to FIG. 5, in decision 112, the computer 4 determines whether an illegal configuration exists. If an illegal configuration exists, the result of decision 112 is YES, and the computer 4 generates an error message in step 116. If an error message is generated, the computer 4 ends the identification and initialization process in step 122 without having initialized any peripheral ports coupled to the bus powered hub 32. If no illegal configuration exists, the result of decision 112 is NO. In that event, the bus powered hub 32 initializes each of the peripheral ports in step 120 to which a peripheral device is connected.

Following the initialization process in step 120, the bus powered hub 32 ends the initialization process in step 122. Thus, the system automatically identifies and initializes each peripheral device coupled to the bus powered hub 32. The switch 70 prevents any illegal configurations from inadvertently causing excessive current drain and a voltage drop on the $V_{cc}$ line 54 of wire cable 33 (see FIG. 3A). In addition, error messages are generated to indicate to the user that an illegal configuration exists. For example, the user may be informed via a message on the computer display 6 or the printer 14 (see FIG. 1) that illegal configuration exists in the bus powered hub. The error message also indicates the nature of the illegal configuration.

As part of the initialization process of the bus powered hub 32 (see FIG. 3A), the control line 72 from the data hub circuitry 60 is activated, which, in turn, causes the activation of the switch 70. Activation of the switch 70 subsequently provides power to any peripheral devices coupled to the bus powered hub 32. Initially, the data hub circuitry 60 designates the peripheral ports as port 1–port 4. As previously discussed, the resistors $R_T$, shown in FIG. 3A, are used by the data hub circuitry 60 to determine whether any peripheral devices are coupled to the bus powered hub 32. In the following discussion of initialization of the peripheral devices coupled to the bus powered hub 32, it is assumed that a peripheral device is coupled to each of the peripheral ports port 1–port 4. If the data hub circuitry 60 determines that any of the peripheral ports port 1–port 4 do not have a peripheral device coupled to it, the initialization procedure for that particular peripheral port is omitted. As part of its initialization, the data hub circuitry 60 relays data to the master data hub 22 indicating the presence or absence of peripheral devices coupled to the peripheral ports port 1–port 4 Following initialization of the bus powered hub 32, the computer 4 sends a data request to port 1 to identify the peripheral device coupled to port 1. The peripheral device coupled to port 1 provides identification data similar to the identification data provided by the bus powered hub 32, as previously discussed. The same procedure is repeated for peripheral ports port 2–port 4 which have peripheral devices coupled thereto. The computer 4 uses identification data to initialize the peripheral device and to identify any illegal configuration. As previously discussed, an illegal configuration can result from a high-power peripheral device, such as device 92 of FIG. 4B, being plugged into the bus powered hub 32, an additional bus powered hub, such as hub 32' of FIG. 4A, being connected to the bus powered hub, or some other combination of peripheral devices that exceeds the USB specifications for the current requirements.

The initialization of the peripheral ports port 1–port 4 is similar to the identification process previously described for the data hub circuitry 60, which is initially designated as port 0. Specifically, the bus powered hub 32 identifies the peripheral device, if any, coupled to peripheral port 1 of the bus powered hub and assigns one or more new addresses to that peripheral device. Thus, the peripheral device will have a new address and will no longer respond to data requests from the bus powered hub 32 to peripheral port 1. The specific address or addresses assigned to the peripheral device are typically assigned sequentially. Alternatively, the system can use default addresses for a device of that type. For example, the USB keyboard 42 (see FIG. 2) will be assigned default addresses for a keyboard while the USB mouse 48 (see FIG. 2) will be assigned default addresses for a mouse. This process is repeated for each of the peripheral ports port 1–port 4 and the peripheral devices, if any, coupled to these ports will be assigned new addresses. While the initialization process is typically carried out when the computer is turned on or reset, user can connect or disconnect peripheral devices at any time. The bus powered hub 32 detects the connection or removal of a peripheral device using the resistors $R_T$, as previously described. The bus powered hub 32 relays data concerning the current status (i.e., connection or removal of peripheral devices) to the master data hub 32, which causes the computer to reinitialize the peripheral port whose status has changed. The system can also generate an error message if the change in status results in an illegal configuration.

While it is possible to include a separate switch 70 for each of the peripheral ports port 1–port 4 coupled to the bus powered hub 32, the present invention provides the necessary protection from illegal configurations without the need for and expense of separate switches. This reduces the overall parts count and also reduces the number of control lines 72 (see FIG. 3A) required from the data hub circuitry 60. As those skilled in the art can appreciate, the cost of the data hub circuitry 60 is directly related to the number of physical pins required for the control lines 72 and the number of switches utilized. This is especially true if the data hub circuitry 60 is manufactured in a large-scale integration (LSI) circuit.

Figure 6:
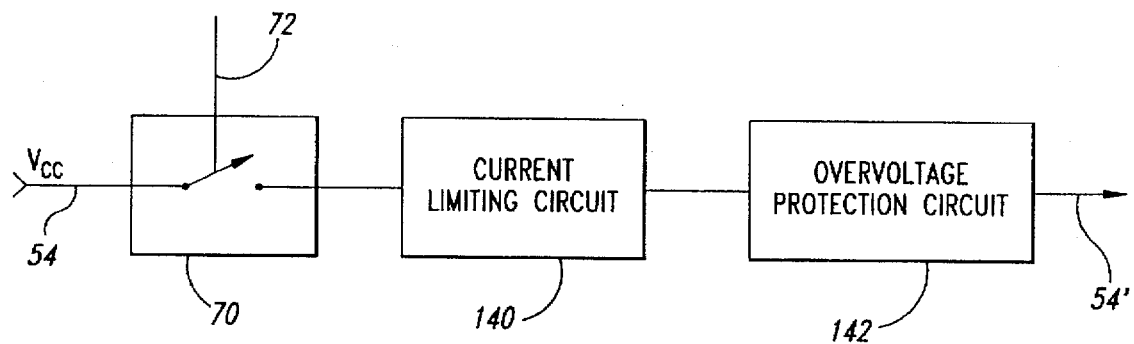
FIG. 6 is a functional block diagram of additional protection circuitry added to the system of FIG. 3A.
Figure 7:
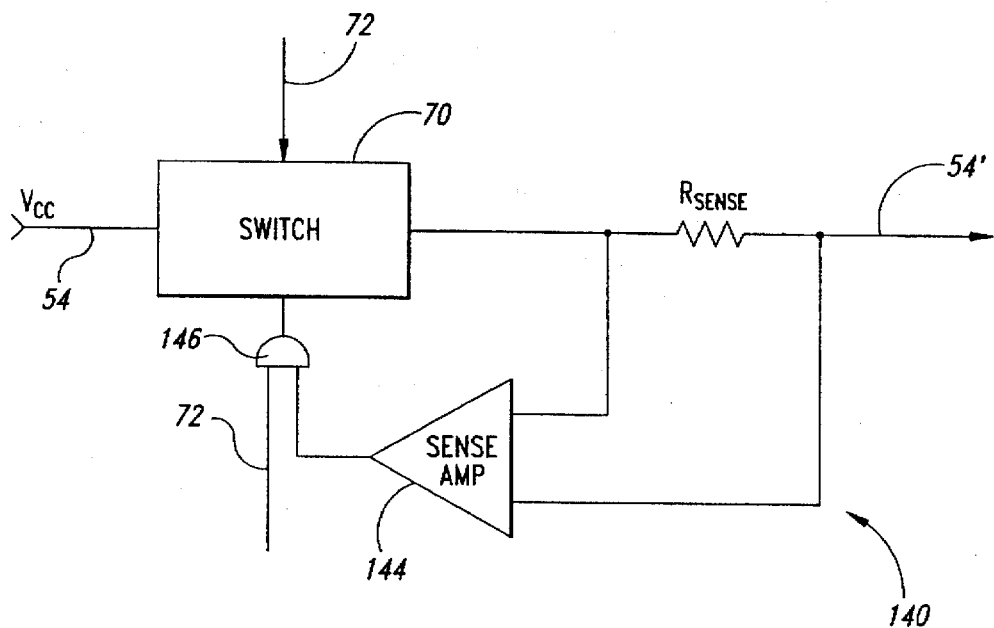
FIG. 7 is an embodiment of the current limiting circuit of FIG. 6.

In addition to the switch 70, the present invention also provides additional protection in the form of a current limiting circuit 140, illustrated in the functional block diagram of FIG. 6, as well as an overvoltage protection circuit 142 within the bus powered hub 32. For the sake of clarity, FIG. 6 illustrates the current limiting circuit 140 and the overvoltage protection 142 are illustrated as separate blocks. However, those of ordinary skill in the art can appreciate that the current limiting circuit 140 and the overvoltage protection circuit 142 can be incorporated into the electrical circuitry of the switch 70. The current limiting circuit 140 prevents a sudden surge of current from the peripheral devices coupled to peripheral ports port 1–port 4 from damaging the switch 70. Current limiting circuits are well known in the art, and need not be described in detail herein. One example of the current limiting circuit 140 is illustrated in FIG. 7 where a resistor $R_{sense}$ in series with the switch 70 and the $V_{cc}$ output line 54' is used to sense the current. A sense amp 144 amplifies the voltage developed across the resistor $R_{sense}$ and applies a control voltage to the input of an AND gate 146, whose other input is the control signal 72. The output of the AND gate 146 controls the switch 70. The switch 70 is active only when enabled by both the control line 72 and the sense amp 144. If the current through the switch 70 exceeds a predetermined threshold, the sense amp 144 deactivates the switch for a preset time. Those skilled in the art will recognize that the switch 70 is a transistor in the embodiment illustrated in FIG. 7. The example of FIG. 7 is but one of several embodiments of the current limiting circuit 140. The present invention is not limited by the specific form of the current limiting circuit 140.

Figure 8A:
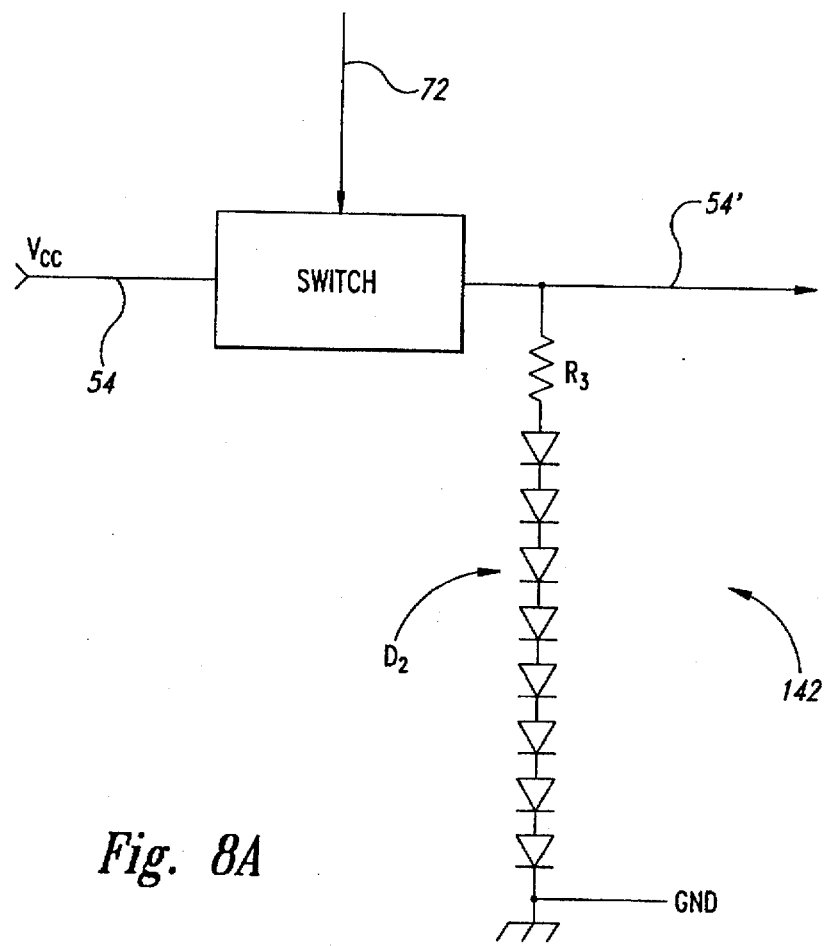
FIG. 8A is an embodiment of the overvoltage protection circuit of FIG. 6.
Figure 8B:
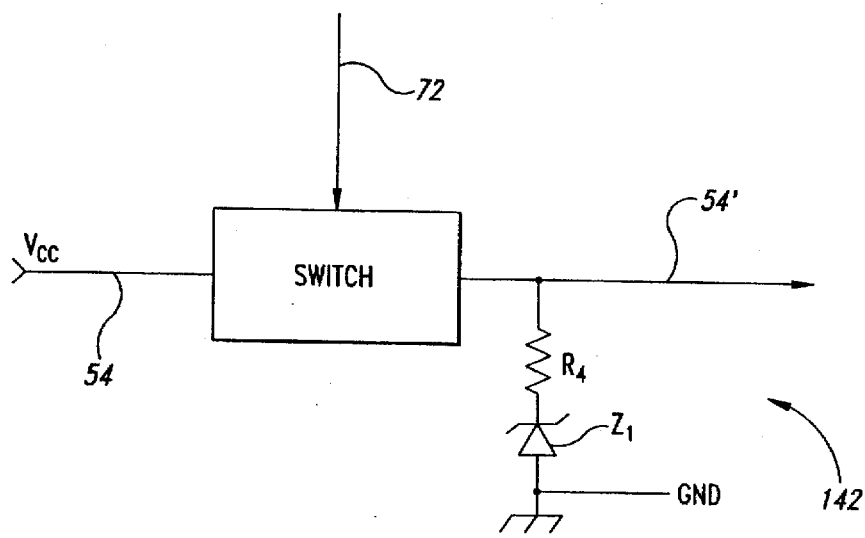
FIG. 8B is an alternative embodiment of the overvoltage protection circuit of FIG. 6.

Similarly, overvoltage protection circuits are well known in the art and need not be described in detail herein. The overvoltage protection circuit 142 of FIG. 6 protects the switch 70 in the event that a peripheral device is unplugged while in operation. As those skilled in the art can appreciate, a sudden disconnection of a peripheral device drawing a significant amount of current can generate a large voltage spike. The overvoltage protection circuit 142 prevents such an overvoltage spike from damaging the switch 70. Examples of the overvoltage protection circuit 142 are illustrated in FIGS. 8A and 8B. In FIG. 8A, the $V_{cc}$ output line 54' is protected from the voltage spike by a resistor $R_3$ coupled to a plurality of diodes $D_2$ connected in series to ground GND. The number of diodes $D_2$ is selected to correspond to the selected threshold at which the overvoltage protection circuit 142 becomes active. If one assumes that approximately 0.7 volts are dropped across each of the diodes $D_2$, the overvoltage protection circuit 142 illustrated in FIG. 8A becomes active at approximately 5.6 volts (8×0.7 volts=5.6 volts). The resistance $R_3$ is selected to limit the current in the overvoltage protection circuit 142 thus protecting the diodes $D_2$.

An alternative embodiment of the overvoltage protection circuit 142 is illustrated in FIG. 8B where a resistor $R_4$ is coupled in series with a zener diode $Z_1$ between the $V_{cc}$ output line 54' and ground GND. The zener diode $Z_1$ becomes active at a selected zener threshold voltage. The resistance $R_4$ is selected to limit the current and to protect the zener diode $Z_1$. The circuits illustrated in FIGS. 8A and 8B are presented merely as examples of the overvoltage protection circuit 142. Those skilled in the art will readily recognize that numerous alternative embodiments may be employed for the overvoltage protection circuit 142. The present invention is not limited by the specific form of the overvoltage protection circuit 142.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the control of power in a universal serial bus coupled to a computer, the computer including a master hub continuously powered by the computer and providing a power source, the system comprising:

a bus powered hub coupleable to the master hub via a first universal serial bus connection and coupleable to a peripheral device via a second universal serial bus connection;

a power supply connector coupleable to the master hub power source via said first universal serial bus connection to receive power therefrom;

a controller within said bus powered hub and coupleable to the computer via said first universal serial bus connection to receive commands from the computer, said controller being continuously powered from the master hub power source via said power supply connector; and a power switch within said bus powered hub and coupleable to the master hub power source through said power supply connector, said power switch being responsive to a power command from said controller to selectively activate said power switch, said power switch sourcing power to the peripheral device via said second universal serial bus connection when said power switch is activated.

2. The system of claim 1 wherein said power switch is a field-effect transistor.

3. The system of claim 1 wherein said power switch is a bipolar transistor.

4. The system of claim 1 wherein said power switch is a relay.

5. The system of claim 1 wherein the computer addresses said controller and said controller generates said power command in response to the computer addressing said controller.

6. The system of claim 1, further including a current-limiting circuit coupled to said power switch to limit current flow to the peripheral device.

7. The system of claim 1 wherein said power switch is powered by a voltage at a predetermined level, the system further including a voltage-limiting circuit coupled to said power switch to limit the voltage level to a predetermined voltage level.

8. The system of claim 1 for use with the computer having an output device wherein the peripheral device has a device identification identifying the peripheral device and providing a device power requirement, the system further including an error message generator to generate an error message for the output device to indicate an illegal configuration if said device identification indicates that said power requirement exceeds a predetermined power level.

9. The system of claim 8 wherein the output device is a visual display coupled to the computer and said error message generator displays said error message on the visual display.

10. The system of claim 8 wherein the output device is a printer coupled to the computer and said error message generator prints said error message on the printer.

11. The system of claim 1 wherein said power switch provides power for each of a plurality peripheral devices coupleable to said power switch via a corresponding universal serial bus connection, said power switch sourcing power to each of said plurality of peripheral devices via said corresponding universal serial bus connections upon activation of said power switch, whereby a single power switch sources power to all peripheral devices coupled to said single power switch.

12. The system of claim 11 wherein said power switch switches at least 400 milliamps of current to said plurality of peripheral devices.

13. The system of claim 11 wherein each of said plurality of peripheral devices include a circuit to generate a signal indicating the presence of said peripheral devices to said controller, said controller detecting the signal and generating a relay signal to the master hub indicating the presence of said peripheral devices.

14. The system of claim 13, further including a data line coupling said controller to said additional peripheral devices, said circuit comprising a resistor coupled between said power and said data line with said resistor receiving power from said power switch and supplying a voltage to said data line.

15. A system for the control of power in a universal serial bus coupled to a computer, the computer including a master hub continuously powered by the computer and providing a power source, the system comprising:

a bus powered hub coupleable to the master hub via a first universal serial bus connection;

a plurality of identical universal serial bus connectors to receive identical universal serial bus plugs from a plurality of peripheral devices;

a controller within said bus powered hub and coupleable to the master hub via said first universal serial bus connection to receive data from the computer, said controller being continuously powered from the master hub power source; and a power switch within said bus powered hub and coupleable to the master hub power source, said power switch being responsive to a power command from said controller to selectively activate said power switch, said power switch sourcing power to said plurality of identical universal serial bus connectors when said power switch is activated.

16. The system of claim 15 wherein said controller generates said power command in response to receiving initialization data from the master hub.

17. The system of claim 15 wherein said power switch is a field-effect transistor.

18. The system of claim 15 wherein said power switch is a bipolar transistor.

19. The system of claim 15, further including a current-limiting circuit coupled to said power switch to limit current flow to said plurality of identical universal serial bus connectors.

20. The system of claim 15 wherein said power switch is powered by a voltage at a predetermined level, the system further including a voltage-limiting circuit coupled to said power switch to limit the voltage level to a predetermined voltage level.

21. The system of claim 15 for use with the computer having an output device wherein each of said plurality of peripheral devices has a device identification identifying the peripheral device and a providing device power requirement, the system further including an error message generator to generate an error message for the output device to indicate an illegal configuration if said device identification from one of said plurality of peripheral devices indicates that said power requirement exceeds a predetermined power level.

22. The system of claim 21 wherein said error generator generates information related to the location of said illegal configuration in said error message.

23. The method of claim 21 wherein said error generator generates information related to reconnection of said plurality of peripheral devices to correct said illegal configuration in said error message.

24. A system for the control of power in a universal serial bus coupled to a computer, the computer including a master hub continuously powered by the computer and providing a power source, the system comprising:

a bus powered hub coupleable to the master hub via a first universal serial bus connection;

a wire cable connectable to the master hub to provide said first universal serial bus connection and thereby receive power from the master hub power source and to exchange data with the master hub;

a controller within said bus powered hub and coupleable to the master hub by said wire cable to exchange data with the computer via the master hub, said controller being continuously powered from the master hub power source via said wire cable;

a plurality of identical connectors to receive identical plugs from a plurality of peripheral devices; and a power switch within said bus powered hub and coupleable to the master hub power source via said wire cable and responsive to a power command from said controller to selectively activate said power switch, said power switch sourcing power to said plurality of identical connectors when activated.

25. A method for the control of power in a universal serial bus powered hub coupled to a computer, the computer including a master hub continuously powered by the computer and providing a power source, the method comprising the steps of:

connecting the bus powered hub to the master hub via a first universal serial bus connection, the bus powered hub being continuously powered from the master hub power source;

in the bus powered hub, receiving data from the computer via said first universal serial bus connection;

generating a power command in said bus powered hub in response to data received from the master hub; and activating a power switch coupled to the master hub power via said first universal serial bus connection to source power to a plurality of identical universal serial bus connectors.

26. The method of claim 25, further including the step of connecting a plurality of peripheral devices, each having an identical universal serial bus plugs, to said plurality of identical universal serial bus connectors, said identical universal serial bus connectors and identical universal serial bus plugs providing power from said power switch to said plurality of peripheral devices.

27. The method of claim 26 for use with the computer having an output device wherein said each of said plurality of peripheral devices has a device identification identifying the peripheral device and providing a device power requirement, the method further including the step of generating an error message for the output device to indicate an illegal configuration if said device identification from one of said plurality of peripheral devices indicates that said power requirement exceeds a predetermined power level.

28. The method of claim 27 wherein said error message includes information related to the location of said illegal configuration.

29. The method of claim 27 wherein said error message includes information related to reconnection of said plurality of peripheral devices to correct said illegal configuration.

30. The method of claim 25 wherein said power command is generated in response to receiving initialization data from the computer via said first universal serial bus connection.

31. The method of claim 25 wherein said power switch is transistor and said step of generating said power command includes the generation of a transistor control signal to selectively activate said transistor.

* * * * *